US012688489B2

(12) United States Patent  
Morrison et al.

(10) Patent No.: US 12,688,489 B2  
(45) Date of Patent: Jul. 21, 2026

(54) INFORMATION HANDLING SYSTEM MICRO MANUFACTURING CENTER FOR REUSE AND RECYCLING FACTORING REPAIR TIME

(71) Applicant: Dell Products L.P., Round Rock, TX (US)

(72) Inventors: John Trevor Morrison, Round Rock, TX (US); Jace W. Files, Round Rock, TX (US); Karthik Suryanarayanan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 362 days.

(21) Appl. No.: 18/103,275

(22) Filed: Jan. 30, 2023

(65) Prior Publication Data

US 2024/0257072 A1     Aug. 1, 2024

(51) Int. Cl.
| | |
|---|---|
| *G06Q 10/30* | (2023.01) |
| *G06Q 10/0637* | (2023.01) |
| *G06Q 10/087* | (2023.01) |

(52) U.S. Cl.
CPC ....... *G06Q 10/30* (2013.01); *G06Q 10/06375* (2013.01); *G06Q 10/087* (2013.01)

(58) Field of Classification Search
None
See application file for complete search history.

(56) References Cited

U.S. PATENT DOCUMENTS

| | | |
|---|---|---|
| 5,579,528 A | 11/1996 | Register |
| 5,966,284 A | 10/1999 | Youn et al. |
| 6,421,237 B1 | 7/2002 | Kim |
| 6,952,767 B1 | 10/2005 | Tanaka |
| 6,954,357 B2 | 10/2005 | Tseng et al. |
| 7,010,634 B2 | 3/2006 | Silvester |
| 7,256,642 B2 | 8/2007 | Kimura |
| 7,446,432 B2 | 11/2008 | Cha |
| 7,957,012 B2 | 6/2011 | Silverbrook et al. |

(Continued)

OTHER PUBLICATIONS

Lejardi, E., et al., "Circularity Protocols for Extending the Useful Lifetime of Obsolete Large Industrial Equipment and Assets," 2021 26th IEEE International Conference on Emerging Technologies and Factory Automation (ETFA), Sep. 7-10, 2021, 8 pages.

(Continued)

*Primary Examiner* — Jeff Zimmerman
(74) *Attorney, Agent, or Firm* — Zagorin Cave LLP; Robert W. Holland

(57) ABSTRACT

Information handling systems are transported to a selected of plural micro manufacturing centers for harvesting of component modules to reuse in remanufactured information handling systems through an automated process that uses a robotic arm to harvest the component modules and rebuild the information handling systems. Component module health lifecycle information is applied to select components for harvesting. Carbon footprint, energy consumption, costs, any manual labor involved and time criticality are factored to select a geographical location to harvest the component modules and to send the system to subsequent end user locations.

20 Claims, 13 Drawing Sheets

(56) References Cited

U.S. PATENT DOCUMENTS

| | | | |
|---|---|---|---|
| 8,422,212 | B2 | 4/2013 | Liu et al. |
| 8,634,873 | B2 | 1/2014 | Jones et al. |
| 8,837,142 | B2 | 9/2014 | McEwan et al. |
| 8,917,501 | B2 | 12/2014 | Hokugou et al. |
| 9,215,813 | B2 | 12/2015 | Brosseau et al. |
| 9,274,565 | B2 | 3/2016 | Tanaka |
| 9,335,799 | B2 | 5/2016 | Nguyen et al. |
| 9,494,976 | B2 | 11/2016 | Bates et al. |
| 9,507,385 | B2 | 11/2016 | Chen et al. |
| 9,829,932 | B2 | 11/2017 | Degner et al. |
| 9,946,981 | B2 | 4/2018 | Gatson et al. |
| 10,006,967 | B2 | 6/2018 | Ganesan et al. |
| 10,008,886 | B2 | 6/2018 | Leabman |
| 10,482,299 | B1* | 11/2019 | Kayara ............... G06F 16/9554 |
| 10,552,249 | B1 | 2/2020 | Johansson |
| 10,726,454 | B2 | 7/2020 | Edmondson et al. |
| 10,811,201 | B1 | 10/2020 | Files et al. |
| 10,955,878 | B2 | 3/2021 | Wang et al. |
| 11,099,605 | B2 | 8/2021 | Knoppert |
| 11,129,318 | B1 | 9/2021 | Rujanavech |
| 11,165,265 | B2 | 11/2021 | Kristjansson et al. |
| 11,226,374 | B2 | 1/2022 | Severson et al. |
| 11,243,576 | B2 | 2/2022 | Gerardi |
| 11,360,153 | B1 | 6/2022 | Wang |
| 2002/0048975 | A1 | 4/2002 | Horikoshi et al. |
| 2002/0085343 | A1 | 7/2002 | Wu et al. |
| 2002/0095491 | A1* | 7/2002 | Edmonds ............. H04L 67/025 709/224 |
| 2004/0012509 | A1 | 1/2004 | Chen |
| 2004/0093287 | A1 | 5/2004 | Gupta |
| 2004/0190239 | A1 | 9/2004 | Weng et al. |
| 2004/0254764 | A1 | 12/2004 | Wetzer |
| 2005/0174094 | A1 | 8/2005 | Purdy et al. |
| 2005/0228916 | A1 | 10/2005 | Telesco |
| 2007/0063675 | A1 | 3/2007 | Walline |
| 2007/0120525 | A1 | 5/2007 | Tsuji |
| 2008/0036628 | A1 | 2/2008 | Satake |
| 2008/0094232 | A1* | 4/2008 | Yokote .................. G06F 1/1616 361/679.08 |
| 2008/0174951 | A1 | 7/2008 | Mundt et al. |
| 2009/0012641 | A1 | 1/2009 | Ruggieri |
| 2009/0168336 | A1 | 7/2009 | Yokote et al. |
| 2009/0198549 | A1 | 8/2009 | Kearns |
| 2009/0222826 | A1 | 9/2009 | Johnson |
| 2009/0259507 | A1 | 10/2009 | Miwa |
| 2009/0321511 | A1 | 12/2009 | Browne |
| 2010/0149741 | A1 | 6/2010 | Liu |
| 2011/0172838 | A1* | 7/2011 | Pai .......................... H02J 3/007 700/295 |
| 2011/0225098 | A1 | 9/2011 | Wolff |
| 2012/0084850 | A1 | 4/2012 | Novak |
| 2013/0088825 | A1 | 4/2013 | Mizoguchi et al. |
| 2013/0222993 | A1 | 8/2013 | Iizuka |
| 2013/0286561 | A1 | 10/2013 | Hokugou et al. |
| 2013/0308261 | A1 | 11/2013 | Matsumoto et al. |
| 2014/0108846 | A1 | 4/2014 | Berke et al. |
| 2014/0204519 | A1 | 7/2014 | Wu |
| 2014/0204520 | A1 | 7/2014 | Wu et al. |
| 2014/0207125 | A1 | 7/2014 | Applegate |
| 2014/0355193 | A1 | 12/2014 | Purcocks |
| 2015/0035370 | A1 | 2/2015 | Wyatt et al. |
| 2015/0172810 | A1 | 6/2015 | McKenzie |
| 2015/0189962 | A1 | 7/2015 | Yeo et al. |
| 2015/0206200 | A1 | 7/2015 | Edmondson |
| 2015/0317951 | A1 | 11/2015 | Genoe |
| 2015/0367513 | A1 | 12/2015 | Gettings |
| 2016/0011627 | A1 | 1/2016 | Lin |
| 2016/0110680 | A1 | 4/2016 | Slaour |
| 2016/0149597 | A1 | 5/2016 | Takasu |
| 2016/0231788 | A1 | 8/2016 | Chen et al. |
| 2016/0316079 | A1 | 10/2016 | Utsonomiya |
| 2016/0359683 | A1 | 12/2016 | Bartfai-Walcott |
| 2016/0366148 | A1 | 12/2016 | Ariel |
| 2017/0004421 | A1 | 1/2017 | Gatson |
| 2017/0011254 | A1 | 1/2017 | Guo |
| 2017/0017213 | A1 | 1/2017 | Miftakhov et al. |
| 2017/0024707 | A1 | 1/2017 | Yang |
| 2017/0085106 | A1 | 3/2017 | Bai |
| 2017/0257303 | A1 | 9/2017 | Boyapalle |
| 2017/0301150 | A1 | 10/2017 | Wojciechowski |
| 2017/0372058 | A1 | 12/2017 | Kulkami |
| 2018/0060133 | A1 | 3/2018 | Fang et al. |
| 2018/0136863 | A1 | 5/2018 | Barajas Gonzalez |
| 2018/0165641 | A1 | 6/2018 | Liberman |
| 2018/0295010 | A1 | 10/2018 | Grobe |
| 2018/0372801 | A1 | 12/2018 | Duhaut |
| 2019/0044436 | A1 | 2/2019 | Hijazi et al. |
| 2019/0122282 | A1 | 4/2019 | Klein |
| 2019/0196011 | A1 | 6/2019 | Brodsky et al. |
| 2019/0196551 | A1 | 6/2019 | Wang et al. |
| 2019/0204392 | A1 | 7/2019 | Bertness |
| 2019/0302852 | A1 | 10/2019 | Kitamura et al. |
| 2019/0311443 | A1 | 10/2019 | Blades |
| 2020/0058081 | A1 | 2/2020 | Saneyoshi |
| 2020/0143334 | A1 | 5/2020 | Kayara |
| 2020/0333852 | A1 | 10/2020 | Smith et al. |
| 2020/0348745 | A1 | 11/2020 | Hamlin et al. |
| 2021/0072725 | A1 | 3/2021 | Rakshit |
| 2021/0081020 | A1 | 3/2021 | Ghose |
| 2021/0110366 | A1 | 4/2021 | Dion et al. |
| 2021/0160355 | A1 | 5/2021 | Min et al. |
| 2021/0170451 | A1 | 6/2021 | Shrout |
| 2021/0223825 | A1 | 7/2021 | Seiler et al. |
| 2021/0309384 | A1 | 10/2021 | El Haloui et al. |
| 2021/0334417 | A1 | 10/2021 | Morrison |
| 2022/0045372 | A1 | 2/2022 | Junger et al. |
| 2022/0114562 | A1 | 4/2022 | Oliver |
| 2022/0179702 | A1* | 6/2022 | Dawkins ............. G06F 11/3433 |
| 2022/0266445 | A1 | 8/2022 | Dambman |
| 2022/0289041 | A1 | 9/2022 | Kinomura |
| 2022/0289067 | A1 | 9/2022 | Adegbohun |
| 2023/0012650 | A1 | 1/2023 | Aggarwal |
| 2023/0061136 | A1 | 3/2023 | Abdollahian Noghabi |
| 2023/0098602 | A1 | 3/2023 | Cella |
| 2023/0185286 | A1 | 6/2023 | Files et al. |
| 2023/0259086 | A1 | 8/2023 | Das |
| 2023/0393553 | A1 | 12/2023 | Donderici |
| 2024/0053410 | A1 | 2/2024 | de la Cropte de Chanterac |

OTHER PUBLICATIONS

O'Connell, S., and Stutz, M., "Product Carbon Footprint (PCF) Assessment of Dell Laptop—Results and Recommendations," May 17-19, 2010, Proceedings of the 2010 IEEE International Symposium on Sustainable Systems and Technology, pp. 1-6.

Adhikary, R., "The Promise of Green Design," In: Design Management Review, Fall 2008, Business Source Complete, pp. 22-29.

Product design and manufacturing process based ontology for manufacturing knowledge reuse. By: Chhim, Peter; Chinnam, Ratna Babu; Sadawi, Noureddin. In: Journal of Intelligent Manufacturing, Feb. 2019. Computer & Applied Sciences Complete, 15 pages.

Dobbin, J., "Are Mechanical Keyboards Better for Gaming?," HP Tech Takes [online], available at https://www.hp.com/us-en/shop/tech-takes/are-mechanical-keyboards-better-gaming>published on Aug. 11, 2018.

* cited by examiner

170 — DETECT KEY INPUT

172 — STORE KEY INPUT IN BUFFER

174 — BUFFER FULL?     NO

YES

176 — TRANSFER BUFFER TO NON-TRANSIENT MEMORY

178 — UPDATE KEY INPUTS TO LIFECYCLE MONITOR

220 — RETRIEVE ENERGY PARAMETERS

222 — RETRIEVE LOGISTICS PARAMETERS

224 — PRIORITIZE REPAIRS

226 — ASSIGN HIGH PRIORITY REPAIRS BASED ON CARBON FOOTPRINT

228 — ASSIGN REMAINING REPAIRS BASED TIME AND CARBON FOOTPRINT

230 — FILL TRANSPORT CAPACITY WITH HAVESTING SYSTEMS

INFORMATION HANDLING SYSTEM MICRO MANUFACTURING CENTER FOR REUSE AND RECYCLING FACTORING REPAIR TIME

BACKGROUND OF THE INVENTION

Field of the Invention

The present invention relates in general to the field of information handling systems, and more particularly to an information handling system micro manufacturing center for reuse and recycling factoring repair time.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally have a stationary or portable configuration. Stationary configurations include desktop and server systems that typically operate in a fixed location with external power and peripherals. Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility. Portable information handling systems also operate with peripheral devices, particularly when the end user is in an office or home environment.

Recently, increased reliance on work from home and improvements in processing, storage and networking capabilities for portable information handling systems have resulted in a greater use of portable information systems for personal and enterprise usage scenarios. Mobile use scenarios can result in greater wear and tear on portable information handling systems with large variances in expected life depending on how and where the systems are used. In some situations, batteries, displays and keyboards integrated in portable information handling systems experience little use, such as when the systems are used with a dock and external peripherals, while in other situations these components are used extensively, such as when the systems are used in mobile scenarios. When a portable information handling system fails due to a component failure, many of the remaining components have substantial useable life. Repairing a portable information handling system by replacing failed components helps to reduce commitment of functional components to landfills, to reduce system costs and to reduce environmental impacts. In some instances, the remaining components have experienced variable use so that the remaining life of the repaired system is uncertain and repairing with new components can be inefficient and cost prohibitive. An alternative is to harvest components from a failed information handling system, test the components for remaining life, and then reuse components where justified. Unfortunately, the expense of breaking down information handling systems, testing the components and rebuilding the information handling systems can often prove prohibitive.

One difficulty with reuse of information handling system components is the tracking of remaining life and predicting of future failures. Another difficulty is tearing down the information handling systems to separate out reusable components and then reassembling the components into refurbished or repaired information handling systems. Although reuse of components seems environmentally friendly on a superficial level, the true environmental cost can include a variety of factors related to the manufacture of the components, operational management of manufacturing activities and transportation logistics. One concern of increasing importance is the carbon footprint associated with information handling systems. Energy use during compute tasks and battery charging can have varied carbon footprint impacts based upon the type of energy available to power the information handling systems. The same is true for manufacturing activities that include component manufacture and reuse. These concerns extend beyond the components themselves to the logistics of component and information handling system manufacture, which can involve transportation across wide expanses by a variety of modes, such as truck, plane and boat. Efforts to improve information handling system usage models typically involve gathering data at a user level that can introduce increased security risks.

SUMMARY OF THE INVENTION

Therefore, a need has arisen for a system and method which tracks information handling system component module state of health to enhance component reuse.

A further need exists for a system and method that manages information handling system use with respect to power source type for improved compute task and battery charging efficiency and distribution.

A further need exists for a system and method that tracks end user inputs in a secure manner that enhances component reuse without information security compromise.

A further need exists for a system and method that automates separation of components from an information handling system to reuse with optimized carbon footprint, remanufacture time and remanufacture cost.

In accordance with the present invention, a system and method are provided which substantially reduce the disadvantages and problems associated with previous methods and systems to reuse information handling system components for remanufacture in an environmentally optimized manner. Information handling system component lifecycle information is securely tracked and applied to manage component reuse at geographically distributed micro manufacturing centers having components selected for reuse to target full component use at a reduced cost in consideration with a carbon footprint.

More specifically, portable information handling systems are geographically distributed to end users, such as at enterprise and home user locations. Each information handling system is built with plural components, such as a motherboard having a central processing unit (CPU) and random access memory (RAM), a solid state drive (SSD), a battery, speakers, a keyboard and cooling fan. The information handling system assembles and disassembles in an automated manner with robotic tools dispersed at the geographically distributed micro manufacturing centers. The components track end user interactions and operating conditions over time, store the lifecycle information in local non-transient memory, share the lifecycle information with each other to ensure all of the component lifecycle information is available at system breakdown, and communicate the lifecycle information to a lifecycle server for analysis. A remanufacture server applies the lifecycle information and energy type information to schedule information handling systems for repair, remanufacture and component harvesting with cost, delivery time and carbon footprint as considerations. For instance information handling systems are selected for repair at geographical locations to target minimal carbon footprint at defined cost and delivery time constraints. Anticipated component lifecycles provide a basis for predicting times and locations associated with failures so that harvesting and remanufacture can be scheduled to further reduce carbon footprint while optimizing an end user experience. Predictive information permits location of micro manufacturing centers so that all factors are optimized, including a balance of cost, automated information handling system tear downs and rebuilds, and manual labor availability. For instance, an enterprise having an install of multiple information handling systems might offer a good location to temporarily place a micro manufacture center so that transportation costs and carbon footprint are improved.

The present invention provides a number of important technical advantages. One example of an important technical advantage is that information handling system component lifecycles are securely tracked and applied to schedule repairs, remanufacture, reuse and harvesting with an optimal mixture of cost and carbon footprint considerations. As components approach end of life within an information handling system, the information handling system is shipped to a micro manufacturing center so that carbon footprint is optimized to have a minimal environmental impact and fill the need for parts in remanufactured information handling systems with reused components harvested from the information handling system that have suitable lifecycle remaining. Automated robotic tools supplemented by manual labor at the micro manufacturing centers offers efficient break down and remanufacture of the information handling systems, such as by reading optical codes from the components to determine the lifecycle remaining. Efficient and small micro manufacturing operations are mobile to move to locations geographically central to a supply of information handling systems that are harvested for components so that carbon footprints associated with transportation are minimized.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system components are repaired and harvested with automated robotic tools at geographically distributed locations to optimally manage cost, time for repairs and carbon footprint. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1A:
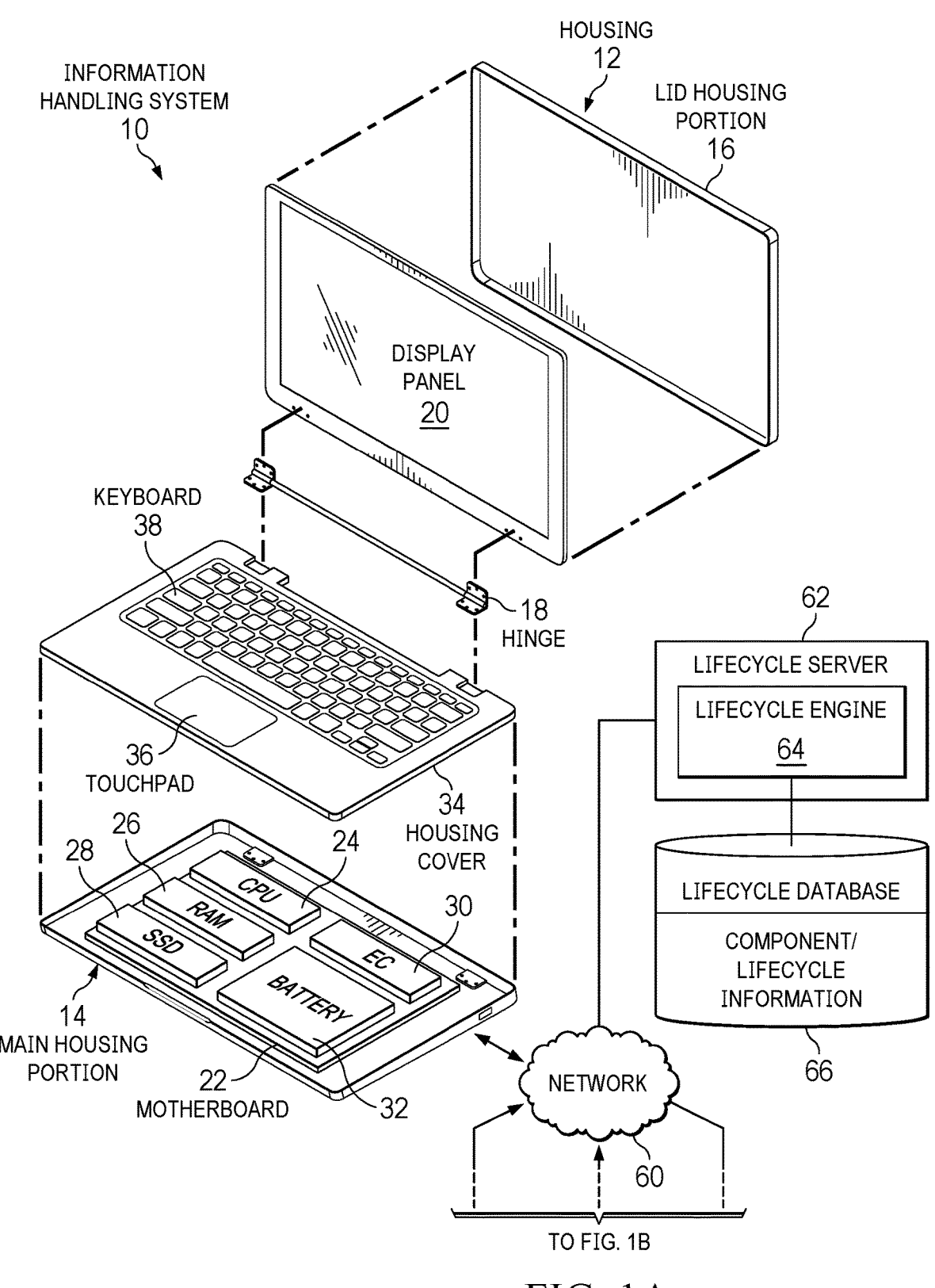
FIGS. 1A and 1B depict an example of plural portable information handling systems configured to report component module lifecycle information to a lifecycle server information handling system.
Figure 1B:
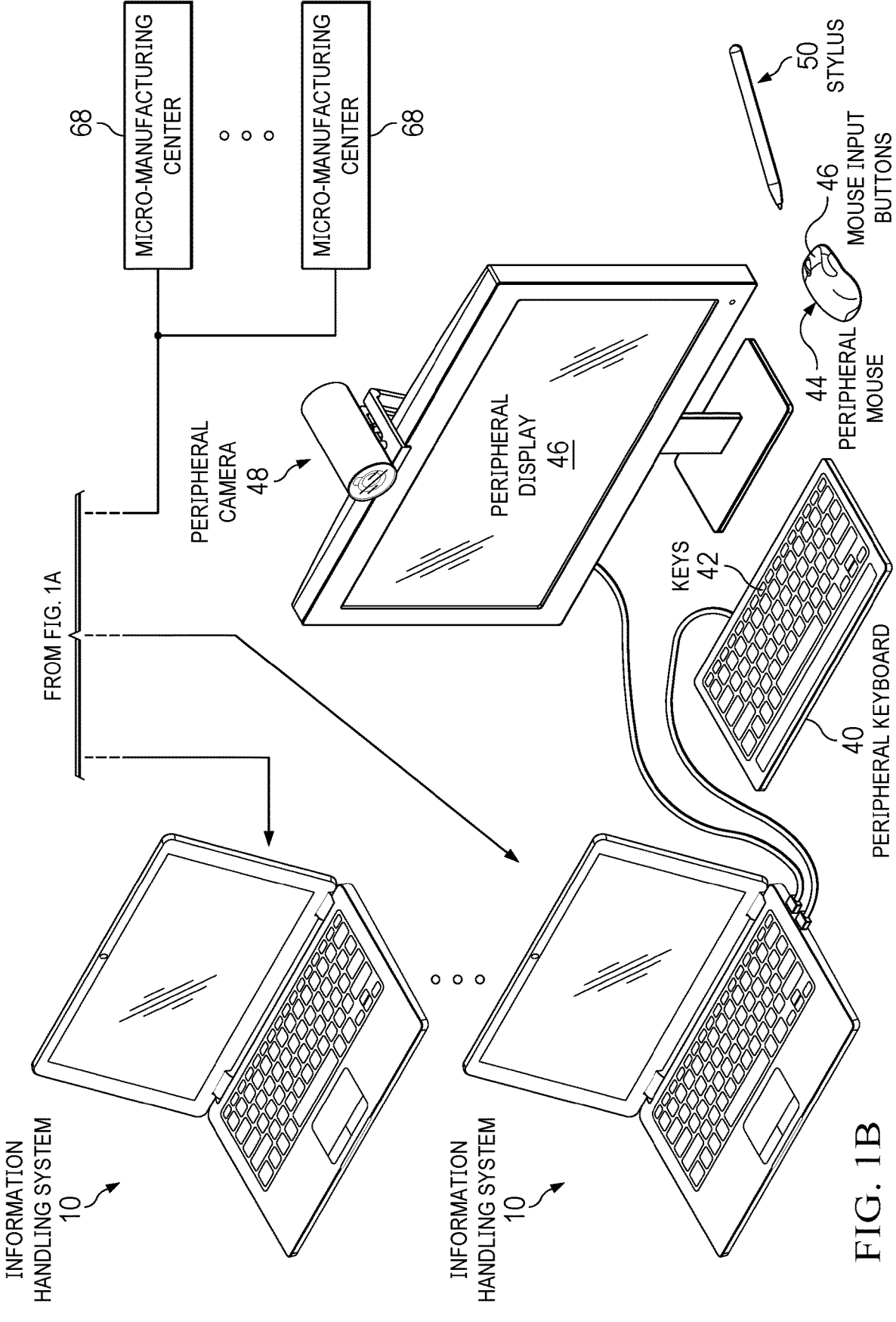

Referring now to FIGS. 1A and 1B, plural portable information handling systems 10 are depicted configured to report component module lifecycle information to a lifecycle server information handling system 62. Based upon lifecycle information relating to information handling system components, information handling systems are selectively transported to micro manufacturing centers 68 for repair, refurbishment, reuse, and recycling. Each information handling system 10 processes information with plural processing components that cooperate to execute instructions, such as of an operating system and applications. In the example embodiment, a portable housing 12 has a main housing portion 14 rotationally coupled to a lid housing portion 16 by one or more hinges 18. In alternative embodiments, other types of portable information handling systems may be used, such as tablets, as well as stationary information handling systems, such as desktops and all-in-ones. In the example embodiment, lid housing portion 16 holds a display panel 20 that presents information as visual images, such as a liquid crystal display panel or an organic light emitting diode display film, each of which present the visual images by an array of color pixels. A motherboard 22 couples to main housing portion 14 and interfaces processing components that cooperate to process information. For instance, a central processing unit (CPU) 24 executes instructions to process information in cooperation with a random access memory (RAM) 26 that stores the instructions and information. A solid state drive (SSD) 28 includes non-transient memory that provides persistent storage during power down, such as flash memory integrated circuits. An embedded controller integrates flash memory and system management instructions that perform system management functions, such as power control, thermal control, and interactions with external peripheral devices. In the example SSD 28 couples to motherboard 22 directly; however, alternative embodiments have SSD 28 as a separate component.

Portable information handling system 10 is assembled and disassembled as separate components that interface and separate with automated robotic tools, such as is disclosed in U.S. patent application Ser. No. 18/081,061 entitled "Information Handling System Keyboard Support with Rail Guide Structure Assembly to a Housing Rail," filed Dec. 14, 2022, by John Trevor Morrison, et al. and incorporated herein as if fully set forth. In the example embodiment, a battery 32 rests in main housing portion 14 to interface with motherboard 22 by a contact interface. A housing cover 34 rests over top of main housing portion 14 to interface an integrated touchpad 36 and keyboard 38 with embedded controller 30. For instance, housing cover 34 fits in place to align connectors between the keyboard and motherboard and is then held in place by a keystone mechanism. Plural portable information handling systems 10 are deployed in geographically distributed locations, such as at enterprise office buildings or home offices. In some locations portable information handling systems interact with end users through peripheral devices, such as a peripheral display 46 having a peripheral camera 48, a peripheral keyboard 40 having plural keys 42 to accept key inputs, a peripheral mouse 44 having a position sensor and mouse buttons 46 to accept mouse inputs, and a stylus 50 having an active tip and rechargeable battery. Generally, the peripheral devices each include a wireless network interface controller (WNIC) that supports communications through wireless signals with a WNIC of information handling system 10, such as through a WIFI or BLUETOOTH protocol.

At each information handling system 10, logic associated with each of the components tracks component use and stores the component use locally as lifecycle information indicative of the remaining life for each component. For example, a lifecycle agent stored in non-transitory memory and executed on embedded controller 30 coordinates the tracking of component use and storage of lifecycle information for each component. In one example embodiment, the lifecycle agent keeps a lifecycle table or database in flash memory of the embedded controller that is updated as components are used and reports the component lifecycle information through a network 60 to a lifecycle server information handling system 62. A lifecycle engine 64 executing on lifecycle server information handling system 62 stores the lifecycle information in a lifecycle database 66 that includes a unique identifier of the component along with the lifecycle information showing the component use and indicative of the component remaining life. Some examples of the types of component lifecycle information can include keyboard total number of key inputs, liquid detection associated with a component, SSD storage writes and operating temperatures, memory bad cells, battery charges and discharges, speaker use and vibrations, cooling fan rotations, and motherboard on/off time. In addition, the component lifecycle information can include peripheral devices that transfer the information to the information handling system when wirelessly interfaced with the information handling system. For instance, peripheral lifecycle information includes keyboard total key presses, mouse button presses, stylus writing contacts, stylus button presses, and battery charge and discharge for any of the peripherals.

In one example embodiment, each component tracked in lifecycle database 66 includes a processing resource, such as an MCU, and a flash memory that stores lifecycle agent instructions to track factors of interest to the life remaining for the component. For instance, a keyboard membrane includes a processing resource that identifies key presses at a membrane having key press detection sensors. A motherboard is tracked as a component with the operational conditions tracked by a lifecycle agent executing in the embedded controller and stored in embedded controller flash memory. A battery includes a battery management unit that tracks charges, discharges, current, voltage and temperatures. An audio process tracks vibrations associated with sounds played at a speaker. Alternatively, the speaker includes an accelerometer that tracks vibrations directly to predict audio membrane degradation. A solid state drive includes a memory controller to track operating temperatures and flash memory cell writes. In addition to tracking this lifecycle information locally, the lifecycle information is communicated to the embedded controller to track all components in one storage location. In order to ensure that all component information is available at reuse of the information handling system, each component can also keep a local database of the lifecycle information of some or all of the remaining components along with a timestamp of the information. System level component lifecycle information stored at each component ensures that the lifecycle information remains available at reuse in the event of an embedded controller or similar failure. For instance, after harvesting a keyboard as the first component from the information handling system, a UART or USB interface with the keyboard matrix controller provides a read from flash memory of the keyboard of all of the components' lifecycle information. When a component is harvested to insert in a remanufactured information handling system, the lifecycle information is downloaded and then the information of other components from the previous information handling system is deleted so that the new systems' components are tracked. In one example embodiment, a lifecycle agent on each component automatically performs a component identification scan for the local lifecycle database storage when the system housing is opened.

Figure 2:
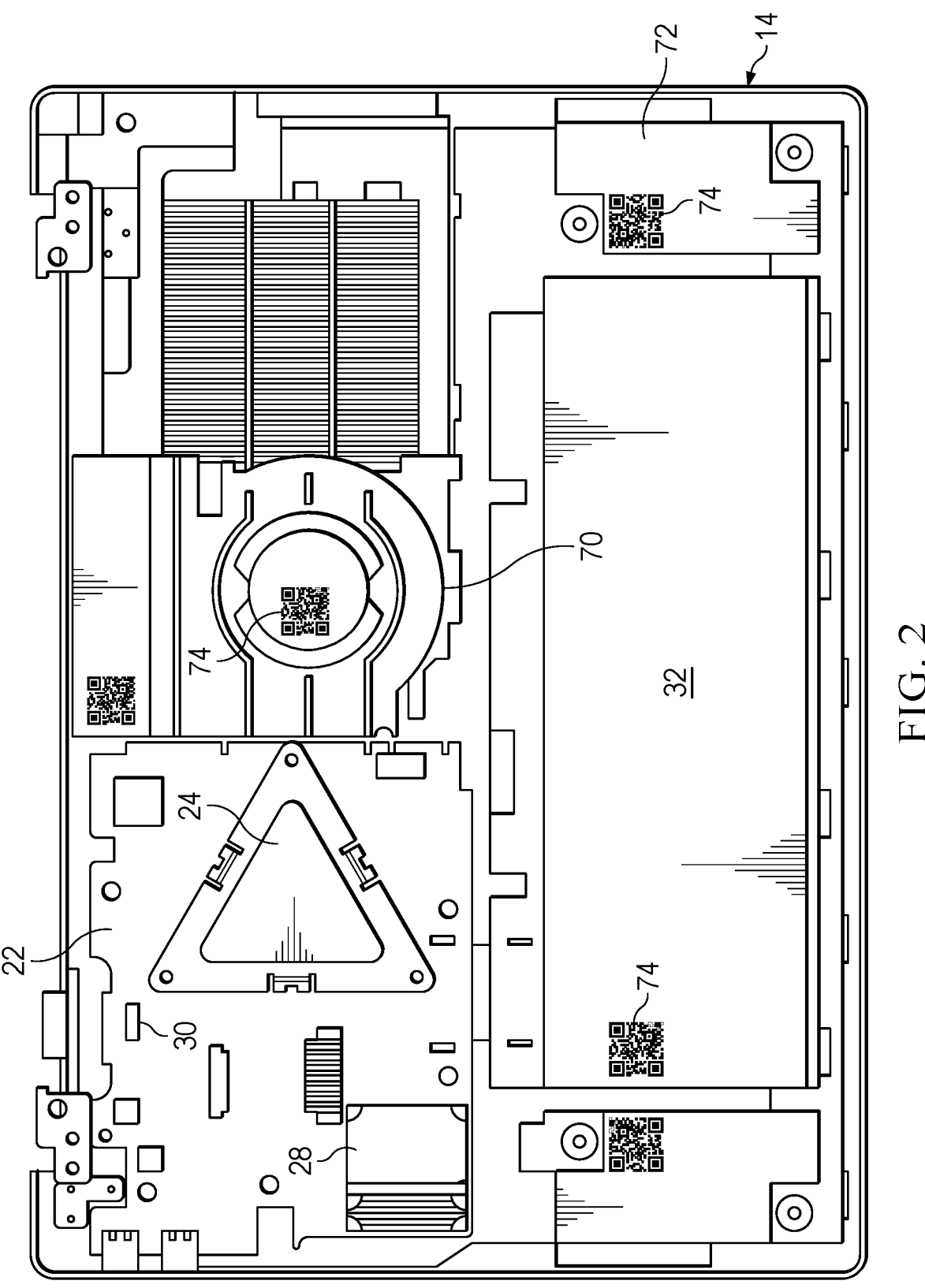
FIG. 2 depicts a portable information handling system main housing portion having components visible by removal of the keyboard cover to expose and optical code having a component unique identifier.

Referring now to FIG. 2, a portable information handling system 10 main housing portion 14 is depicted having components visible by removal of the keyboard cover to expose and optical code 74 having a component unique identifier. In the example embodiment, main housing portion 14 includes a motherboard 22 with a CPU 24, a solid state drive 28, an embedded controller 30, a battery 32, a cooling fan 70 and speaker 72. A QR optical code 74 couples to individual components so that the component's unique identifier is read by an optical scanner to support a lookup of the component's lifecycle information. As discussed above, correlation in the lifecycle database between the unique identifiers of the components allows a scan of one optical code to retrieve the lifecycle information of the remaining components. For example, SSD 28 includes power/performance SSD SAMRT data thermal tracking. The keyboard includes intrusion detection, key press statistics, trackpad usage and liquid spill detection. The display panel includes pixel degradation detection, cracked screen recognition and power tracking. The battery includes battery charge and discharge cycles, retained charge capacity and battery cell swell detection. The speaker includes audio quality information, diaphragm stress and rare earth element tracking information. Optical codes 74 aids tracking of key parameters of components and component modules to track the state of health across geographically dispersed portable information handling systems. The optical codes and an interface with a cloud-based database create a digital lifecycle passport for each component to track through its usable life. Each digital lifecycle passport contains a state of health for a component, such as the information handling system in which it is currently installed, a history of information handling systems, the material makeup of the component to indicate recyclability and rare earth metals, the method and location for recycling and similar information. In addition to the cloud-based storage of the digital lifecycle passport, the health information can also be embedded in the component firmware, which is readable through a standard interface at component separation.

Figure 3:
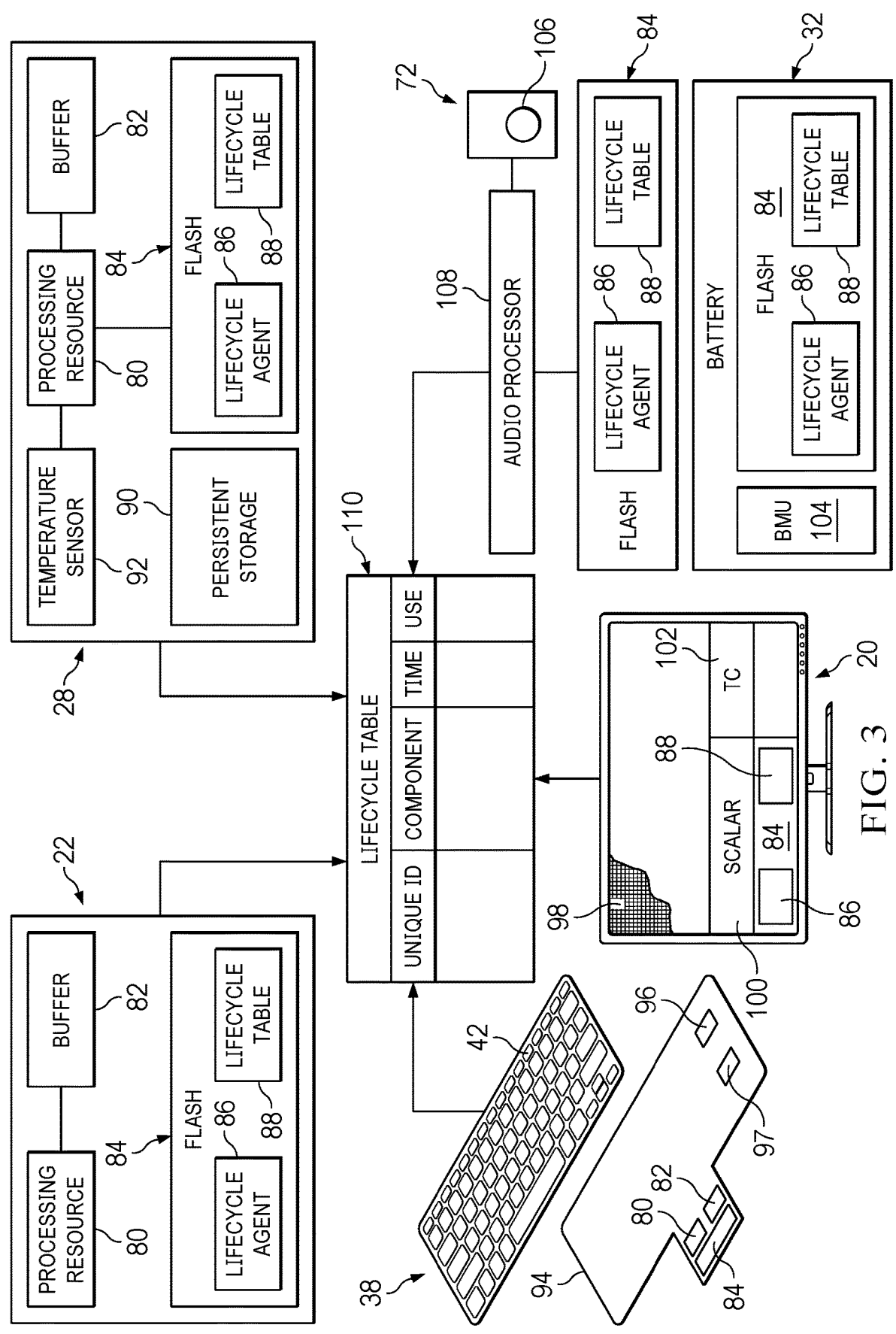
FIG. 3 depicts a block diagram of plural processing components configured to interact to store lifecycle information in a table locally on an information handling system in which the components are operating.

Referring now to FIG. 3, a block diagram depicts plural processing components configured to interact to store lifecycle information in a table locally on an information handling system in which the components are operating. A motherboard 22 includes a processing resource 80 and buffer 82 to store lifecycle information in real time that is, in turn, transferred to a flash memory 84 for storage in a lifecycle table 88. A lifecycle agent 86 executing on processing resource 80 includes instructions that cause tracking of component lifecycle information for periodic updates to lifecycle table 88. As an example, the processing resource of motherboard 22 is the embedded controller. Buffer 82 is a short term memory that couples processing resource 80 to store life cycle information in batches that the processing resource cannot access until the buffer fills and is transferred to flash 84. Storing in batches in this manner temporarily and logically separates real time information from access by processing resource 80 the help secure the information, as is set forth below in greater detail. Life cycle table 110 is an example of state of health information that is stored for information handling system components, such as a unique identifier for each component, the component type, a time stamp of the lifecycle information and specific use information. Life cycle table 110 is stored, for instance, in flash 84 of the motherboard embedded controller. In addition, life cycle table 110 can be stored in any other component so that multiple copies are kept.

Keyboard 38 has keys 42 that perform inputs with presses against key sensors 96 of membrane 94. Keyboard membrane 94 has a circuit board formed in an extension that includes a processing resource 80, buffer 82 and flash memory 84 that stores the lifecycle agent. In addition, keyboard membrane 94 includes a liquid sensor 97 that senses the presence of liquid. Processing resource 80, such as a key matrix controller, executes instructions of the lifecycle agent to track a total number of key presses that indicate a life cycle of keyboard 38. The key presses and any liquid detection events sensed by liquid sensor 97 are stored in lifecycle table 110. Liquid detection provides an indication of a risk of a liquid spill to all of the components of the information handling system and, as such, is stored in each of the components for review on component reuse. Lifecycle agent 86 instructions of keyboard 38 adds security to the total key press number so that security of keyed inputs is not compromised. For instance, a total number of presses may be tracked without tracking the key values so that the key inputs remain secure. Alternatively, key press values may be tracked for less than all of the key values so that complete key inputs cannot be tracked. When only part of the key input values are tracked, a statistical estimate of untracked keys is performed based upon total key presses and known key values to estimate the number of untracked keys. As an example, tracking keys commonly used in gaming will provide a worse case analysis for keys likely to fail due to excess use while estimating a normal distribution for non-gaming systems. As an example, key values on a QWERTY keyboard associated with gaming are typically adjacent the S and D keys and also the space bar and enter keys. In the keyboard example, when key values are tracked along with a total number of key presses, the buffer is configured to store a minimum number of key values before transferring the key input count to the lifecycle table so that passwords are not disclosed. As an example, a minimum buffer size stores ten times the maximum number of values for a password so that the password is not inadvertently disclosed in the total key inputs by key values when the buffer transfers to the lifecycle table. In particular, the processing resource is unable to read the buffer, which is triggered to transfer when full. The key values are processed in the lifecycle table to show a total number for each key so that an order of the key value inputs cannot be derived. In one embodiment, the buffer is transferred in a random order to further impede disclosure or historical inputs.

A display panel 20 presents visual images with an array of pixels 98 that provide illumination with desired colors controlled by a scalar 100 and a timing controller 102. In the example embodiment, the processing resource 80 executes the lifecycle agent to store lifecycle information from a buffer 82 to a flash memory 84. In an alternative embodiment the lifecycle agent may execute on scalar 100 and/or timing controller 102. The lifecycle information can include pixel degradation, cracked screens, LED backlight usage, total usage and other factors. For instance, a liquid detection by the keyboard can write a liquid detection event to the display lifecycle information so that the display is check for liquid damage if reused. As another example, the display life cycle information may be written from an embedded controller to the display lifecycle table based upon the type of visual information presented at the display through a graphics processor. A similar type of lifecycle tracking is depicted with speaker 72 and battery 32. Speaker 72 includes a diaphragm 106 that wears variably based upon the type and volume of audio played. An audio processor 108 provides the audio settings to a lifecycle agent executing on a processing resource to store the wear on the diaphragm in a speaker lifecycle table. In an alternative embodiment, the processing resource, buffer and flash may reside on the speaker to estimate vibration based on speaker signals and/or include a sensor, such as an accelerometer, that directly measures vibrations associated with speaker operation. Similarly, battery 32 includes a battery management unit 104 (BMU) with a processing resource 80, buffer 82 and flash memory 84 to execute the lifecycle agent and keep the lifecycle table. A solid state drive 28 stores information in persistent storage 90, such as flash memory, and monitors operations with a temperature sensor 92. Lifecycle information includes temperatures during operations, memory cell degradation, dead cells, and storage rotation to keep the cells balanced. As is described above, each component can store some or all of the lifecycle information for the other components so that any one component removed from an information handling system for reuse provides readable non-transient memory with lifecycle information of other components.

Figure 4:
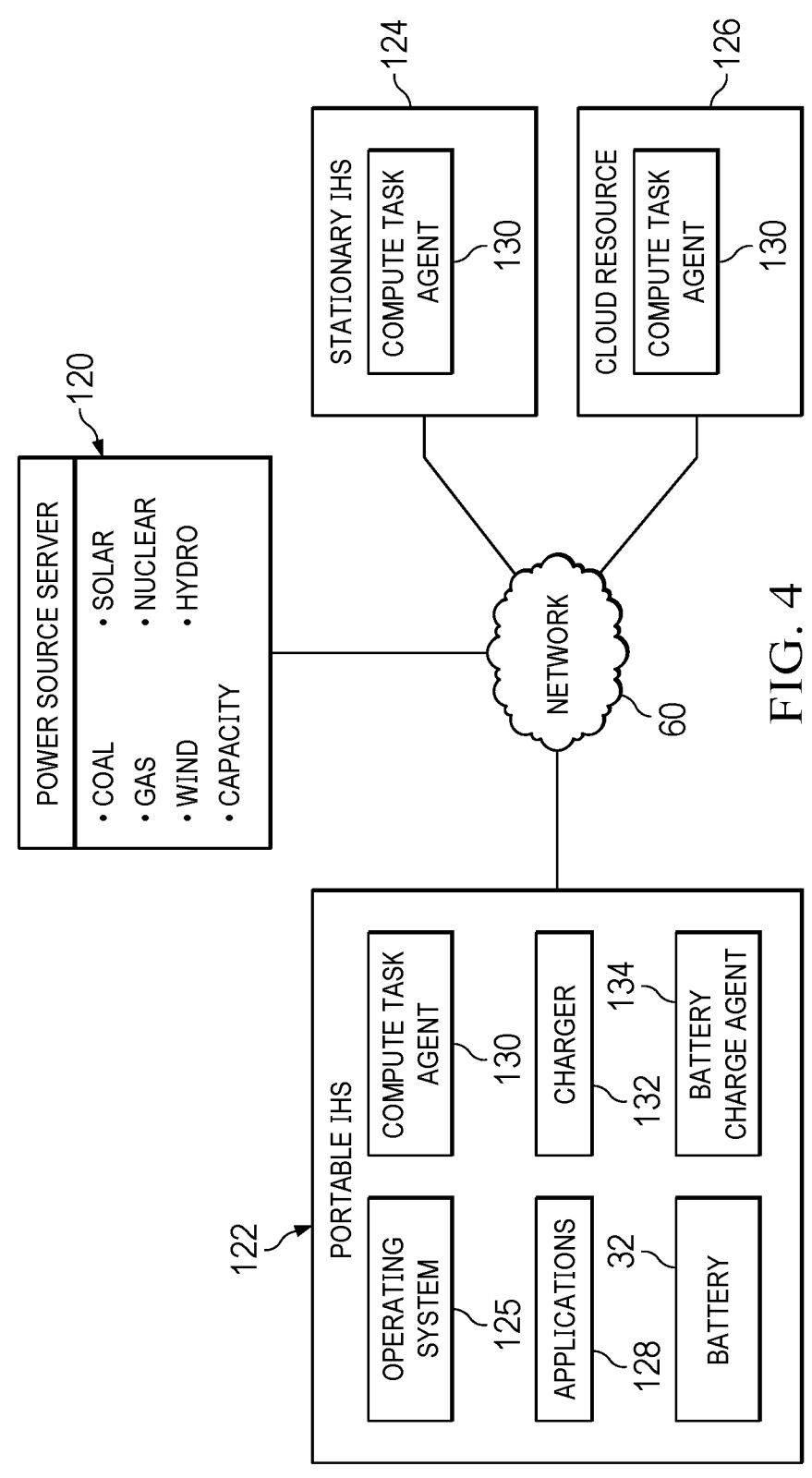
FIG. 4 depicts a block diagram of a system that manages information handling system operations based upon a carbon footprint of energy that supports the information handling system operations.

Referring now to FIG. 4, a block diagram depicts a system that manages information handling system operations based upon a carbon footprint of energy that supports the information handling system operations. In the example embodiment, a power source server 120 interfaces with network 60 to distribute information relating to the carbon footprint of the type of energy supplied to information handling systems, such as a mixture of coal, natural gas, nuclear, wind, solar, hydro or other types of energy and the capacity of energy available at which the mixture will change, such as when a natural gas turbine will add to the power grid as "green" power reaches constraints. Adding energy composition as a factor to manage information handling system operations allows for more efficient and environmentally friendly impacts. The specific example of FIG. 4 focuses on management of operations that include execution of compute tasks by a portable information handling system 122 and a stationary information handling system 124 that interface with a cloud resource 126 through a network 60. Portable information handling system 122 executes an operating system 125 and applications 128 on processing resources like those described above using external power and/or power from a battery 32 that is charged by a charger 132. A compute task agent 130 is stored in non-transitory memory, such as in an SSD as an operating system driver, and executes instructions on the system CPU to detect compute tasks of a predetermined scope and assign the compute task to a processing resource based at least in part on the type of energy available as defined by power source server 120. Battery charge agent 134 executes on a processing resource of charger 132 or battery 32 to manage battery charges based at least in part on the type of power provided from power source server 120. In one embodiment, battery charge agent 134 directly initiates retrieval of the energy type information to manage charges when the information handling system is powered off. Stationary information handling system 124 is a desktop or server that portable information handling system 122 can access to perform compute tasks. Cloud resource 126 has cloud processing capabilities that can perform the compute task remotely. Both stationary information handling system 124 and cloud resource 126 include a compute task agent to monitor the type of energy associated with compute tasks.

Compute task agent 130 and battery charge agent 134 cooperate to manage compute tasks in a manner that promotes selection of green energy over carbon energy to reduce information handling system carbon footprint. Real time carbon footprint information retrieved from power source server 120 optimizes selection of compute platform to perform a compute task with carbon footprint as a factor. For example, if portable information handling system takes two minutes to perform a compute task and the local energy source is less clean, such as coal, the compute task is instead performed at the end user's desktop 124 or a cloud resource 126 with a more green energy mix. The selection of the local system or a remote system includes a number of other factors, such as the amount of time that each resource will take to perform the compute task, the criticality of the compute task, the priority of the end user, the type of application performing the compute task, and whether the compute task can be divided between multiple compute resources, such as at split locations. In some instances, portable information handling system 122 may locally perform the compute task by leveraging battery power without charging until a more green mix of energy is available. In such a scenario, anticipated end user interactions, such as based on time of day and historical work schedule, can allow a battery draw down with a charge performed during a time having an anticipated improvement in the carbon footprint of the energy source mix. The decision on the location to perform a compute task may be made locally at portable information handling system 122 where the compute task was created or remotely when a request to perform the compute task is communicated. For instance, portable information handling system 122 determines locally a carbon footprint factor and communicates parameters for the compute task including the local carbon footprint factor to cloud resource 126, which accepts the compute task if its own local carbon footprint factor is less environmentally impactful and rejects the compute task if not. Alternatively, portable information handling system 122 sends the compute task request to the cloud resource 126, which then decides where to perform the compute task, include the end user's desktop or a specific location available in the cloud. In yet another embodiment, portable information handling system 122 retrieves energy information for each of the possible compute locations and determines locally where to perform the compute task.

Figure 5:
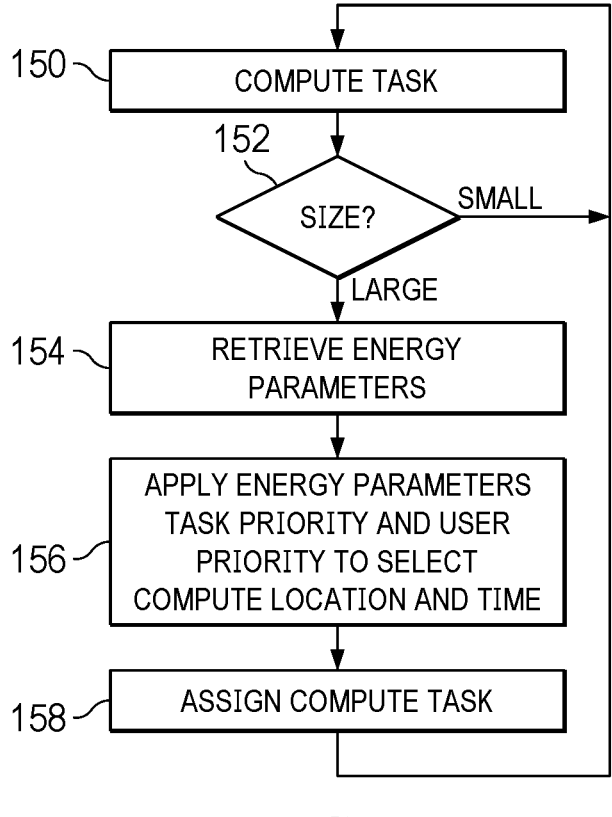
FIG. 5 depicts a flow diagram of a process that manages information handling system operations based upon a carbon footprint of energy that supports the information handling system operations.

Referring now to FIG. 5, a flow diagram depicts a process that manages information handling system operations based upon a carbon footprint of energy that supports the information handling system operations. The process starts at step 150 with detection of a compute task at an information handling system. The process continues to step 152 to determine if the compute task is of sufficient size to qualify for execution at a remote compute resource. Although the example embodiment relates to a portable information handling system running a task and a compute task agent on a CPU, in an alternative embodiment, the compute task agent may run on a smaller processing resource that monitors the CPU so that energy use at the information handling system is kept to a minimum. If the compute task is less than a predetermined size, the process returns to step 150. If the compute task exceeds the predetermined size, the process continues to step 154 to retrieve the energy parameters for performing the compute task locally and remotely. At step 154 the energy parameters are applied along with other factors, such as task priority, end user priority and time criticality, to select the compute location and time at 156. At step 158 the compute task is assigned to a compute resource that optimizes carbon footprint relative to the other factors and then the process returns to step 150 to wait for the next compute task.

Figure 6:
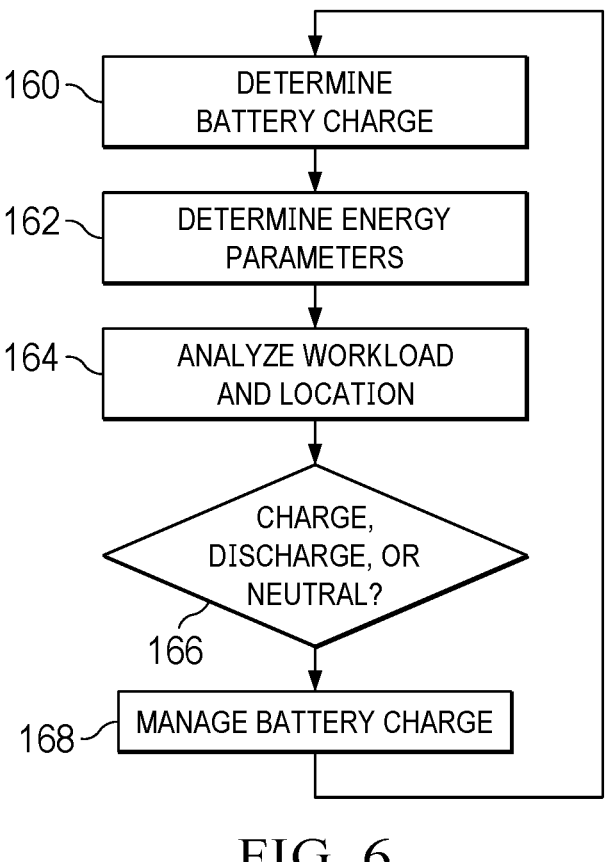
FIG. 6 depicts a flow diagram of a process for managing battery charge based on power grid capacity and carbon footprint characteristics.

Referring now to FIG. 6, a flow diagram depicts a process for managing battery charge based on power grid capacity and carbon footprint characteristics. As is discussed above, the process executes on a processing resource that retrieves energy parameters, such as an MCU of a charger that interfaces with the power source server through the Internet to coordinate battery charge with real time intelligence related to the power grid energy source and capacity. For example, if an external power source relies more heavily on coal at a particular time and the battery charge is above a minimum for operating conditions, the battery charge will pause until the power source becomes more green. When a renewable power source is available, the information handling system battery will charge at a maximum rate. When capacity is tight so that extra load could lead to use of carbon fuel, the battery charges at a reduced rate. The decision to charge or not and the rate at which to charge can depend upon anticipated or predicted energy parameter changes and information handling system predicted power use, such as based on historical information of workload and location. For instance, an end user working on a laptop at home in the morning who typically leaves for work in a brief time period does not need a charge and can delay the charge until she arrives at work. In one embodiment, the end user is presented with a warning about the lower charge and offered an opportunity to override the charge delay with a note relating to the reduced carbon footprint if charge is delayed for different energy parameters at the work office. In another embodiment, battery discharge is used when the information handling system has a heavy workload so that external power draw is kept at a steady low rate when carbon footprint is high and increased to charge the battery when carbon footprint is decreased, such as due to availability of renewable energy.

The process of FIG. 6 starts at step 160 with a determination of the battery charge state. At step 162, the energy parameters are determined, such as by retrieving the carbon footprint factors of energy sources at the grid in use. In one embodiment, the carbon footprint information is retrieved from charger integrated circuit through a network interface. In another embodiment, the network is the power grid, which provides the carbon footprint information as a discrete analog or digital signal communicated to the power grid over the power lines. At step 164 the workload and location of the information handling system are analyzed to determine if a charge is needed, when the charge is needed and what rate of charge to apply. At step 166 a determination is made of whether to charge the battery, discharge the battery or maintain a neutral power transfer to the information handling system. At step 168 the battery charge is managed accordingly and the process returns to step 160 to continue monitoring the battery charge.

Figure 7:
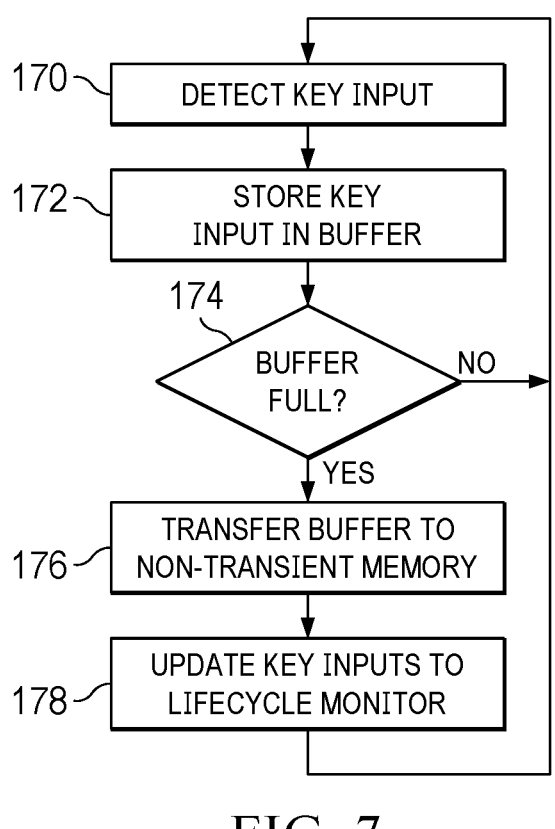
FIG. 7 depicts a flow diagram of a process for securely tracking keyboard key presses to monitor keyboard state of health.

Referring now to FIG. 7, a flow diagram depicts a process for securely tracking keyboard key presses to monitor keyboard state of health. As is described above, the keyboard membrane includes a circuit board having a processing resource, buffer and non-transitory memory to track the number of key presses and thereby estimate a state of health of the keyboard or remaining life. A difficulty with tracking keyboard health is that tracking key presses can present a security issue that allows a malicious actor to spy on an end user, such as by discovering passwords keyed in by the end user. The process starts at step 170 by detecting key inputs, such as key presses against a keyboard membrane key detection sensor. At step 172, the key inputs are stored in a temporary buffer of a predetermined size. To secure the key press values, the buffer holds key press values inaccessible to the processing resource until the buffer is full, and the buffer size is sufficient to prevent disclosure of inputs when the buffer is accessed, such as at least ten times the maximum size of a password. At step 174, a determination is made of whether the buffer is full. If not full, the buffer is kept inaccessible to the processing resource and the process returns to step 170. When the buffer is full, the process continues to step 176 to transfer the buffer values to the non-transient memory and to step 178 to update the key inputs tracked by the lifecycle table to reflect the new total number of key inputs for each value. By tracking in the non-transient memory only the total number of each value, a sequence of value inputs remains hidden so that the end user inputs are secure.

Keyboard health is securely tracked by transferring key input values in batches that hide the sequence of inputs to prevent key logging by malicious actors. Additional security steps are applied to further secure key input values at batch transfer. One example is that the batch is transferred from buffer to the non-transient memory in an order different from the order of inputs, such as a random order. Another example is that batch transfers are performed only after a minimum time has passed in addition to a minimum number of key inputs. The minimum time ensures that multiple expanses of inputs are made so that passwords are more difficult to separate from within the batch key values. Another example is that only some key input values are stored in the buffer while others may or may not be tracked to provide a total number of key inputs. Tracking only part of the key press inputs as key values (as opposed to total key presses) prevents recreation of inputs during processing resource writes to the lifecycle table. A statistical probability is then applied to derive likely total presses for keys that have values not tracked in the lifecycle table. As an example, tracking just gaming keys as values in combination with total number of key inputs offers a more accurate estimate of inputs for each value and tracks values for the keys most likely to wear first. For instance, tracking QWERT-ASDFGZXCVB plus space bar and enter supports an algorithm based upon comparison of total presses versus values to the gaming keys that predicts total presses for the non-gaming keys. In various embodiments, some or all of the gaming keys may be tracked as values in addition to some non-gaming keys so that the risk of exposing passwords is limited.

Figure 8:
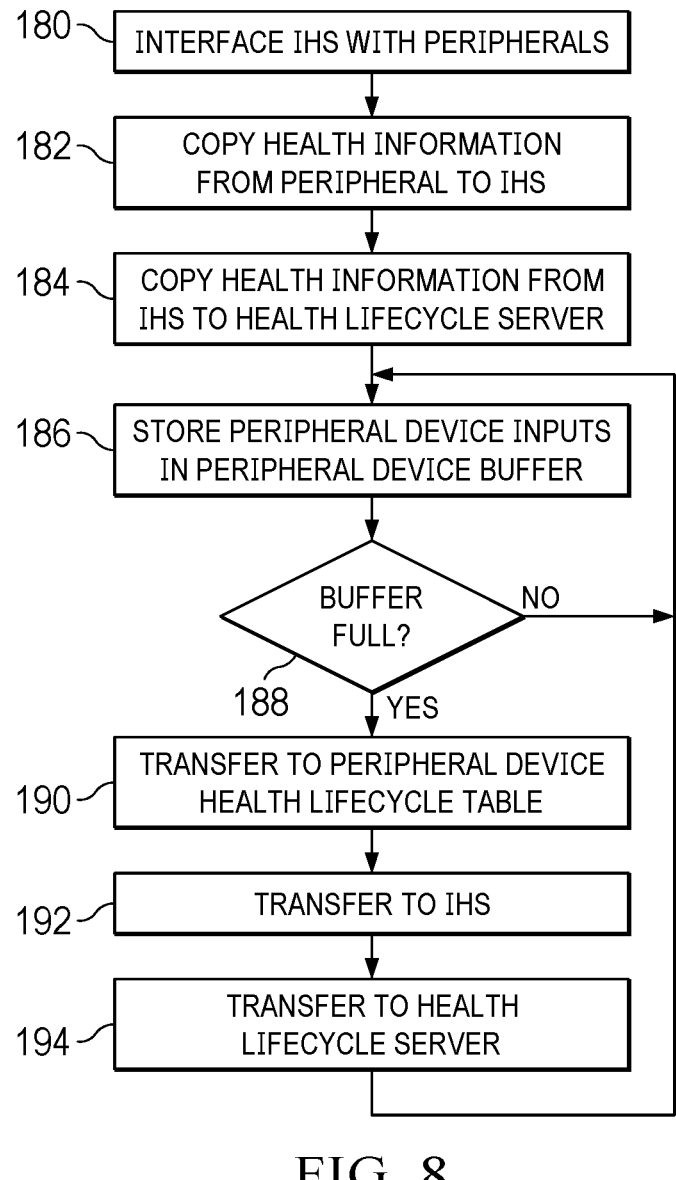
FIG. 8 depicts a flow diagram of a process for securely tracking peripheral devices state of health, such peripheral keyboard key presses and peripheral mouse button inputs.

Referring now to FIG. 8, a flow diagram depicts a process for securely tracking peripheral devices state of health, such peripheral keyboard key presses and peripheral mouse button inputs. As is described above, information handling systems typically interface with peripheral devices through wireless signals, such as BLUETOOTH. A particular information handling system might interface with a variety of different peripheral devices at different locations, such as a home office or enterprise cube. Peripheral devices in an office device typically include a keyboard, mouse, stylus, display and stylus. Each of these devices includes a processing resource, buffer, non-transient memory and life cycle agent as described above to track health state locally, and also provides the health state or lifecycle information to an information handling system that communicates the information to a lifecycle server. The lifecycle information in some instances is tracked on an information handling when not interfaced with the peripheral, such as where the peripheral commonly interfaces with the information handling system.

The process starts at step 180 when the information handling system interfaces with the peripheral devices. At step 182 the information handling system retrieves the health information from the peripheral device. In the example of a peripheral keyboard, the lifecycle information may be tracked similar to the method of FIG. 7. Mouse peripheral information can include button clicks or accelerations. A stylus can include button presses, such as a button press to advertise for BLUETOOTH, and writing tip presses that can wear down the writing tip. A peripheral display can track time in use and pixel degradation as described above. In addition, battery charge and discharge information is tracked where the peripheral has a rechargeable battery. At step 184, the health information is copied from the information handling system to the health lifecycle server similar to information handling system component lifecycle information. At step 186, each of the peripheral devices stores lifecycle information, such as end user key and button presses, in a buffer of the peripheral device. At step 188 a determination is made of whether the buffer is full. If not full, the process returns to step 186. Once the buffer is full, the process continues to step 190 to transfer the lifecycle information to a peripheral lifecycle table in non-transitory memory of the peripheral. At each write of lifecycle information to the non-transitory memory, the process continues to step 192 to transfer the peripheral device use to the information handling system. At step 194, when the peripheral device updates the lifecycle information to the information handling system, the information handling system copies the peripheral lifecycle information to the health lifecycle server and the process returns to step 186 to continue monitoring peripheral use.

Figure 9:
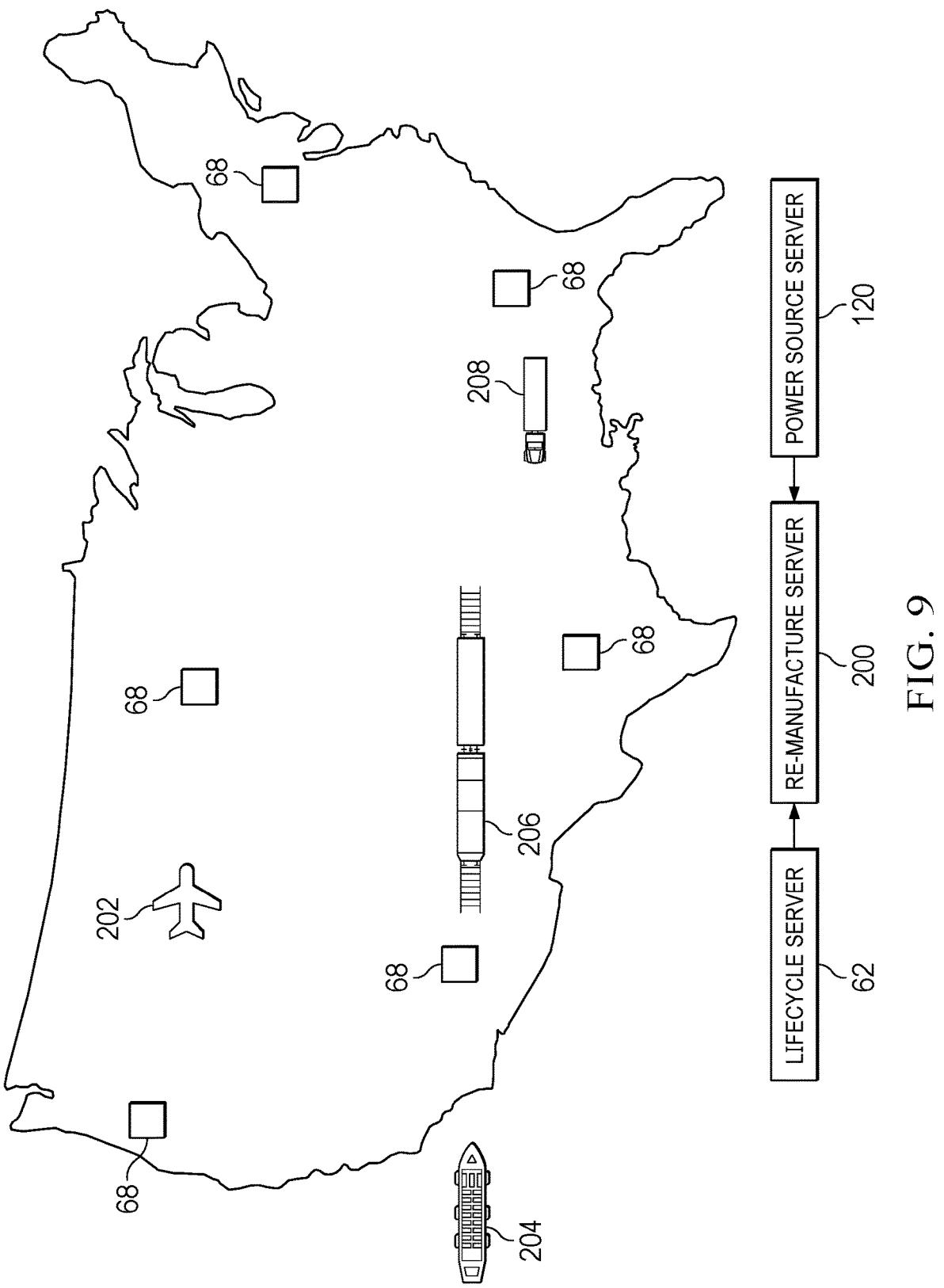
FIG. 9 depicts a block diagram of a distributed system for remanufacture, repair, reuse and harvesting of information handling systems that factors cost, carbon footprint, inventory, time criticality and automated versus manual labor availability.

Referring now to FIG. 9, a block diagram depicts a distributed system for remanufacture, repair, reuse and harvesting of information handling systems that factors cost, carbon footprint, inventory, time criticality and automated versus manual labor availability. The example depicts a plurality of micro manufacturing centers 68 geographically distributed that have automated and manual labor to disassemble and assemble information handling systems. The micro manufacturing centers 68 are relatively small and also mobile so that a micro manufacturing center can move to a location at which information handling systems are directed for repair and/or component harvesting. For example one embodiment of a micro manufacturing center includes plural robotic tools and manual labor tools that fit into a single semitruck trailer to move between warehouses where information handling systems are shipped. Another example might have several trailers that ship the equipment. In one embodiment, a micromanufacturing center operates from within an trailer interior to eliminate most set up and tear down functions and enable rapid movement to new locations. As illustrated in the example, information handling systems ship to a micro manufacturing center by airplane 202, boat 204, train 206 and truck 208. Each type of transportation has a cost, a time factor and a carbon footprint that are applied when selecting a micro manufacturing center for an information handling system. In addition, the type of repair and/or components available for harvesting informs a destination for an information handling system. In the example embodiment, lifecycle server information handling system 62 provides lifecycle information to a re-manufacture server information handling system 200 that applies the lifecycle information, the geographical locations and the available logistics to determine where an information handling system is sent for repair and/or harvesting. In addition, re-manufacture server information handling system 200 applies the carbon footprint characteristics from power source server 120 to determine a carbon footprint of energy that supplies the micro manufacturing center. An optimization is performed by remanufacture server information handling system 200 with available information so that timely remanufacture and repair of information handling systems is performed with harvested components, minimized costs and minimized carbon footprint.

Figure 10:
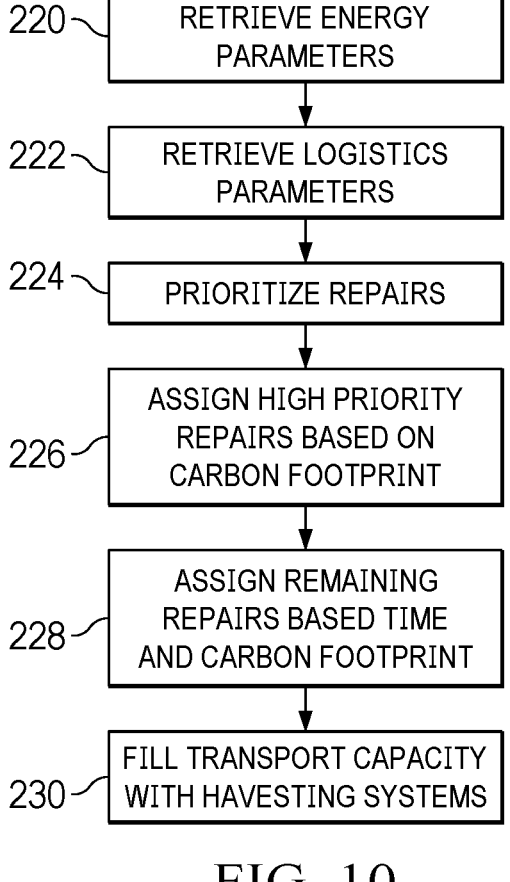
FIG. 10 depicts a flow diagram of a process that adjusts remanufacture, repair, reuse and harvesting of information handling systems based upon the impact of carbon footprint.

Referring now to FIG. 10, a flow diagram depicts a process that adjusts remanufacture, repair, reuse and harvesting of information handling systems based upon the impact of carbon footprint. The process starts at step 220 with retrieval of energy parameters for the micro manufacturing centers, such as the types of energy, the cost and the carbon footprint associated with each set of energy parameters. At step 222, the remanufacture server retrieves logistics parameters associated with each micro manufacturing center, such as the type of transportation, the cost and the carbon footprint for each set of logistics parameters. At step 224, scheduled or requested repairs are prioritized, such as to meet a warranty or other agreement relating to return to an end user of a failed information handling system. In some instances, repairs are prioritized based on an associated end user or on a type of failure. In other instances, repairs are prioritized based upon availability of an inventory of reused components needed to perform the repair and the components available for harvesting from failed information handling systems that are shipped to the micro manufacturing center. At step 226, the highest priority repairs are scheduled to meet a time constraint and a carbon footprint constraint. The carbon footprint includes the transportation of the system, the energy used at the geographical micro manufacturing center and the carbon footprint associated with a failed component's replacement. Once the high priority repairs are scheduled, the process continues to step 228 to assign the remaining repairs based upon repair time and carbon footprint. When a lower priority repair allows additional time, greater flexibility is provided to improve the carbon footprint by selection of a location to perform the repair and a transportation mode to the location. As repairs are scheduled within appropriate time constraints, the process continues to step 230 to fill transport and micro manufacturing center capacity with information handling systems having components available to harvest. For instance, the life cycle information indicates what components are available for harvesting and the inventory of those components at each micro manufacturing center is maintained by selecting destinations with carbon footprint as a consideration.

Figure 11:
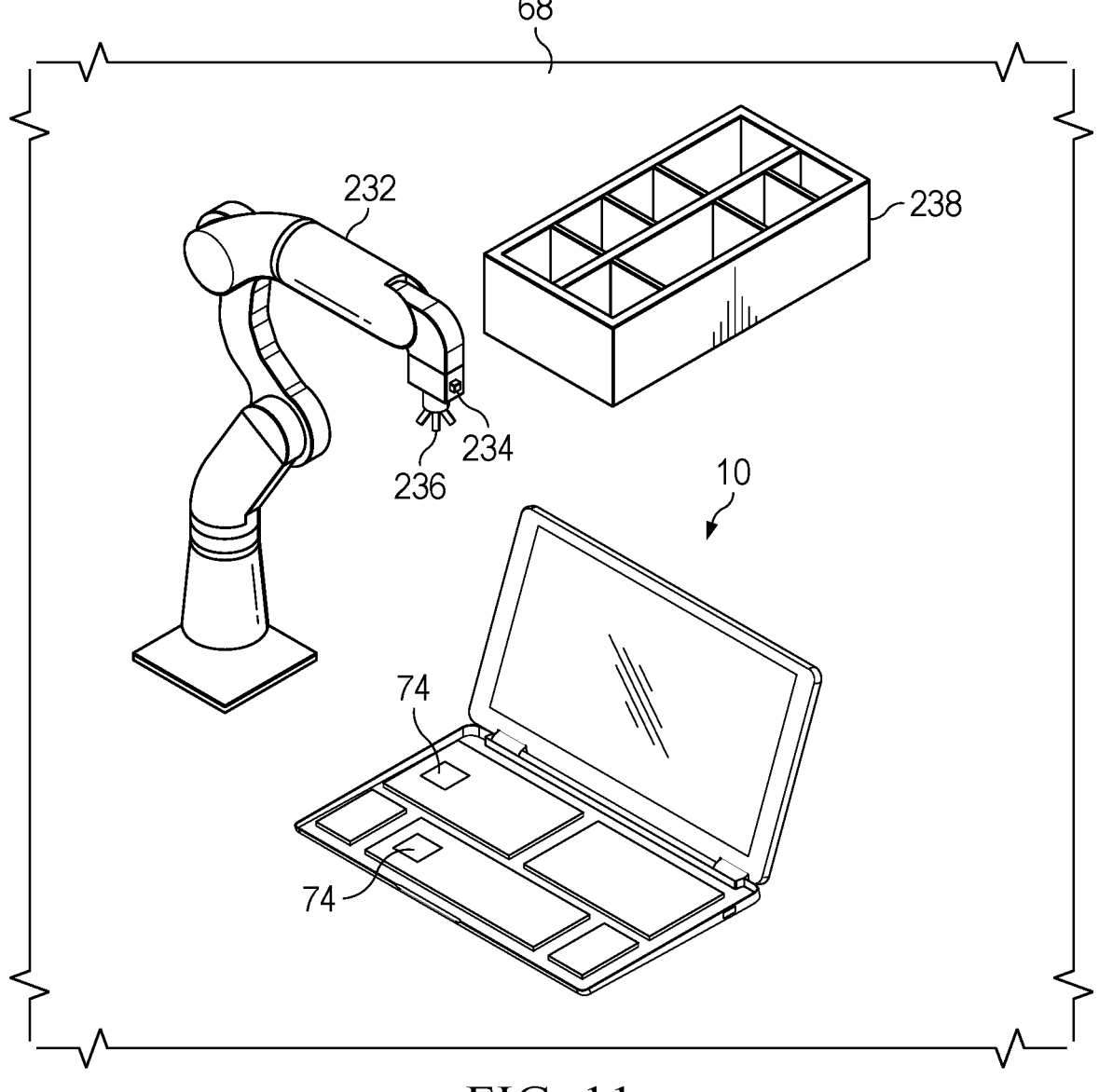
FIG. 11 depicts an example of a micro manufacturing center, robotic tool and optical reader that automates remanufacture, repair, reuse and harvesting of information handling systems.

Referring now to FIG. 11, an example of a micro manufacturing center 68, robotic tool 232 and optical reader 234 is depicted that automates remanufacture, repair, reuse and harvesting of information handling systems. Robotic tool 232 reads optical codes 74 from components of information handling system 10 to retrieve lifecycle information for the components. Selectable tools 236 change out to support interactions with different types of components. For example, a keystone removes from information handling system 10 to release the housing cover. The housing cover lifts off to release the components. Each of the components then lifts out of the housing without unscrewing screws or other coupling devices. Based upon the lifecycle information, the remanufacture server information handling system determines what components to remove and replace to repair information handling system from an inventory 238. Alternatively, components are removed and placed in inventory 238 to reuse in other information handling systems. An arrangement of components are selected for remanufacture that will give a defined performance from the information handling system, including anticipated return of the system for reuse and the carbon footprint associated with such a return. In some instances, manual labor will also be involved in the information handling system assembly and disassembly, with the scope of the manual labor dependent on the type of repairs. All of these factors result in a total cost for reuse that drives component selections and end of life decisions.

Figure 12:
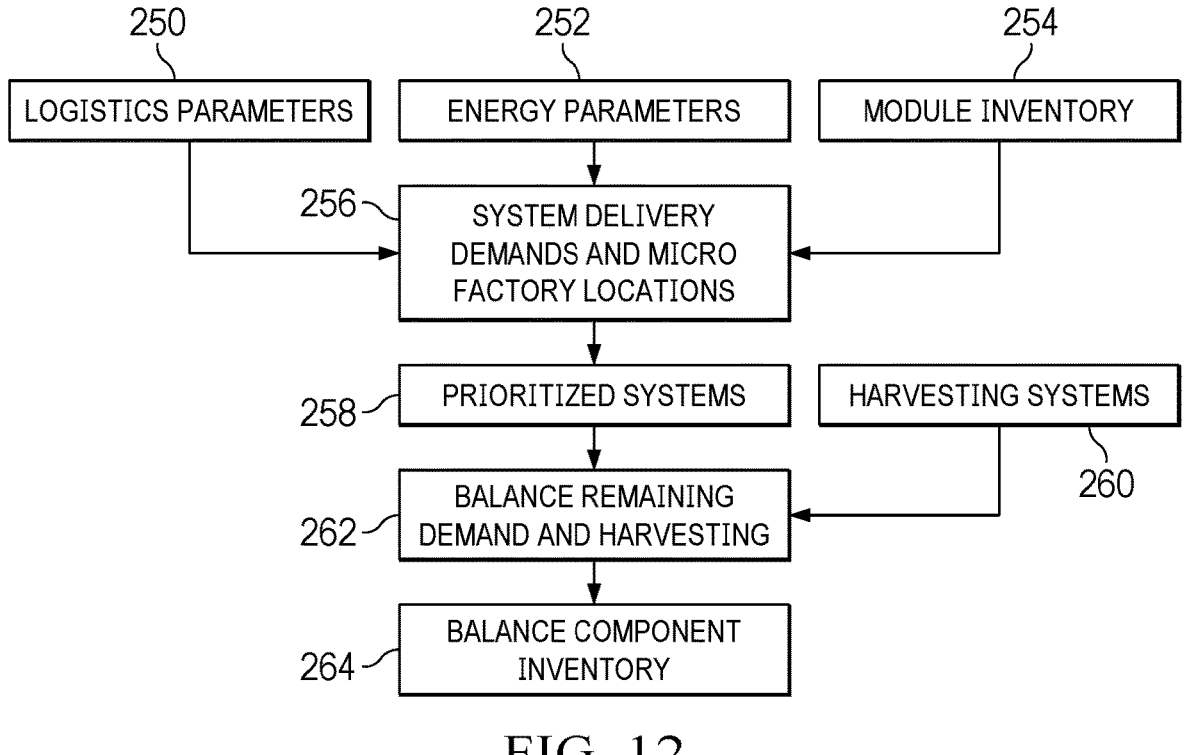
FIG. 12 depicts a flow diagram of a process for optimizing remanufacture, repair, reuse and harvesting of information handling systems based upon factors including cost, carbon footprint, inventory, time criticality and automated versus manual labor availability.

Referring now to FIG. 12, a flow diagram depicts a process for optimizing remanufacture, repair, reuse and harvesting of information handling systems based upon factors including cost, carbon footprint, inventory, time criticality and automated versus manual labor availability. The process starts with inputs of logistics parameters 250, energy parameters 252 and component module inventory 254 to a determination of the information handling system delivery demands and micro manufacturing locations at step 256. The logistics parameters include the type of transportation available to transport information handling systems for repair and harvesting, to transport components that support the repairs and to transport replacement information handling systems to end users after repair and remanufacture. Along with the type transportation are the carbon footprint for each type, such as measured in tons of CO2, a cost for each type, and a time factor for each type, such as days to delivery. Energy parameters include the carbon footprint and cost of the type of energy for each location. The energy parameters can define expected types of energy based upon, for example, whether which changes the mix of renewable energy. The component module inventory includes an available inventory of each type of component for performing repairs, a cost of each component, and a location of each component relative to the location of the micro manufacturing centers. In addition, the component inventory tracks expected inventory as information handling systems are harvested at each location and based upon the lifecycle information of the harvested systems. At step 256, the logistics, energy and component module inventory 254 are applied to schedule micro manufacturing center activities, such as disassembly of information handling systems based on lifecycle information to harvest components and schedule repairs. At step 258 the information handling systems having a priority for repair are scheduled. Priority can involve warranty or end user criticality factors. At step 262, the lower priority information handling system repairs are scheduled and at step 260 the harvesting of components is scheduled in a balanced manner to optimize component inventory and timeliness of repairs versus cost and carbon footprint. At step 264, the component inventory is balanced as information handling systems are disassembled for harvesting.

Micro manufacturing centers increase manufacturing and repairing flexibility by offering mobility and an adaptable mixture of automated and manual labor. For example, when an enterprise location has a concentration of information handling systems that lifecycle information shows in need of repair or remanufacture, moving a micro manufacturing center to the enterprise location reduces the carbon footprint of the remanufacture operation. The information handling systems are optimized for automated robotic tools to disassemble and assemble with the aid of optical readers and optical codes that associate components and lifecycle information. Alternatively, the robotic tools access non-transitory information of a single component to retrieve the lifecycle information of all components. The robotic tools automate a reset of the local lifecycle table at each component when reused so that the information handling system has refreshed memory at reuse; alternatively, at power up in a new system, the component resets its lifecycle table to reflect reuse with different components. In part, automated robotic tool operations are performed where no screws and cables are involved in the manufacture of the information handling systems. When manual labor is helpful, the lifecycle information is referenced to ensure that a balance of manual and automated handling is available, such as where a liquid detection suggests manual visual inspection of the system interior. The robotic tool optically grades the quality of the components and builds an inventory for reuse of components in remanufactured information handling systems. The remanufacture server has an overview of inbound information handling systems to coordinate reuse and remanufacture so that a minimal amount of component replacements are performed and a reduced carbon footprint is achieved.

Generally, the remanufacture server monitors deployed information handling systems to improve reliability and replace systems as lifecycle information indicates increased probability of failure. Based upon the predicted system component failures, shipments to micro manufacturing centers are scheduled with a balance of total cost and carbon footprint impact weighed against harvesting of components for reuse before failure and reliability sufficient to meet warranty obligations, such as in a subscription model. In addition to balancing carbon footprint by the scheduling systems for transport and work, capacity of micro manufacturing centers is also balanced with the use of manual labor and total cost. For instance, in periods of low carbon footprint, an increase in labor and transportation costs may be justified by the reduced overall carbon footprint relative to that anticipated at a future time period. As one example, the remanufacture server orders a replacement of a deployed information handling system so that the components of the deployed system are harvested for reuse with other components having a similar lifecycle state of health. This operation takes place in a time of extra robotic tool capacity and low carbon footprint so that the total cost of the system is reduced as is the carbon footprint impact. In one embodiment, the balance of carbon footprint and cost has a minimum limit on the number of components in inventory so that systems are ordered for return to a micro manufacturing center for harvesting when the inventory of one or more of the components becomes too lean. In one example embodiment, systems may be sent for harvesting based upon cost and carbon footprint and then the components, which weigh less, may be moved to a different micro manufacturing location, such as based on remanufactured system delivery location and the local micro manufacturing center balance of automated versus manual labor. In part, the locale decisions may be done in part based upon the time for delivery of the systems where time criticality may result in increased cost and carbon footprint impact.

Although the present invention has been described in detail, it should be understood that various changes, substitutions and alterations can be made hereto without departing from the spirit and scope of the invention as defined by the appended claims.

What is claimed is:

1. A system for information handling system manufacture, the system comprising:
  plural geographically distributed micro manufacturing centers, each micro manufacturing handling center having robotic resources to assemble and disassemble information handling systems and an inventory of new components and reused components harvested from used information handling systems;
  plural distributed information handling systems, each having components including a processor that cooperates with a memory to process information and a non-transitory memory, the non-transitory memory storing instructions that when executed on the processor cause tracking of a lifecycle of the components automatically as a background operation that detects and records component use to report as lifecycle information to a network location;
  a lifecycle server information handling system having a processor and memory that cooperate to process information and a non-transitory memory to store instructions, the lifecycle server information handling system interfaced through a network with the plural distributed information handling systems to retrieve the component lifecycle information of the plural components included in each of the plural distributed information handling systems; and
  a remanufacture server information handling system interfaced with the lifecycle server information handling system, the remanufacture server information handling system having a processor, memory and non-transient memory, the non-transient memory storing instructions that when executed on the processor cause shipment of the plural information handling systems to the plural micro manufacturing centers to repair the plural distributed information handling systems and to harvest the components from the plural distributed information handling systems to reuse at a selected of the plural geographically distributed micro manufacturing centers in remanufactured information handling systems, at least some of the repaired and remanufactured information handling systems including the harvested components, the instructions scheduling repairs and harvesting to maintain a predetermined time in which the repairs are performed by adjusting the location to which to plural information handling systems are shipped based upon the inventory of components at each of the micro manufacturing centers.

2. The system of claim 1 wherein remanufacture server further schedules harvesting of the components with priority over repairs when an inventory of the components meets a minimum inventory threshold.

3. The system of claim 1 wherein the remanufacture server selects a micro manufacturing center to repair one or more of the plural distributed information handling systems having a failed first component based upon an inventory at the selected micro manufacturing center of a second harvestable component.

4. The system of claim 1 further comprising:
  a power source server information handling system interfaced through the network and operable to communicate types of energy associated with the plural geographically distributed micro manufacturing centers;
  wherein the remanufacture server information handling system further selects the component in part on a carbon footprint.

5. The system of claim 1 wherein the carbon footprint includes both a transportation carbon footprint associated with transportation of the information handling system and a manufacture carbon footprint associated with operations of the selected micro manufacturing center.

6. The system of claim 1 wherein the remanufacture server information handling system selects the component based at least in part on a total cost to perform the repair.

7. The system of claim 6 wherein each of the plural geographically distributed micro manufacturing centers includes at least some robotic tools and some manual labor, the remanufacture server information handling system allocating repair and harvesting to manage the total cost.

8. The system of claim 1 wherein the component comprises a keyboard having plural keys and a liquid detection sensor, the keyboard lifecycle information including a total number of key presses at the keyboard.

9. The system of claim 8 wherein the component comprises a speaker, the lifecycle server information handling system tracks vibrations associated with playing of audio by the speaker and liquid detection events detected by the keyboard liquid detection sensor.

10. The system of claim 8 wherein the component comprises a solid state drive having persistent storage and a temperature sensor, and the life cycle server information handling system tracks temperatures and a liquid detection event associated with the solid state drive.

11. A method of automated reuse of components used in distributed information handling systems comprising:
  distributing plural micro manufacturing centers geographically;
  distributing plural information handling systems geographically, each having plural components including a processor, a memory and a non-transitory memory, the non-transitory memory storing instructions that detect use of the component automatically as a background operation to estimate the component lifecycle;
  tracking lifecycle information of the components when the components are used in the information handling systems, the tracking at a network location interfaced with the plural information handling systems through a network and communicated automatically from each of the plural information handling systems as component use is detected at each of the plural information handling systems;
  receiving repair requests at the network location for one or more of the distributed information handling systems; and directing from the network location one or more of the plural micro manufacturing centers to repair the plural distributed information handling systems and to harvest the components from the plural distributed information handling systems to reuse at a selected of the plural distributed micro manufacturing centers in remanufactured information handling systems, at least some of the repaired and remanufactured information handling systems including the harvested components, the directing scheduled to maintain a predetermined time in which the repairs are performed based at least in part on an inventory of harvested components used in the repairs.

12. The method of claim 11 further comprising:

scheduling the harvesting of the components with priority over repairs when an inventory of the components meets a minimum inventory threshold; and selecting a micro manufacturing center to repair the one or more of the plural distributed information handling systems based upon an inventory of a failed component of the information handling system.

13. The method of claim 12 further comprising selecting a micro manufacturing center to repair one or more of the plural distributed information handling systems based upon reusable components in the one or more of the plural distributed information handling systems.

14. The method of claim 11 further comprising:
monitoring energy type in use at each of the plural micro manufacturing centers; and
selecting a micro manufacturing center to repair an information handling system based in part on a carbon footprint.

15. The method of claim 11 selecting the micro manufacturing center based in part on a carbon footprint of transportation of the information handling system to the micro manufacturing center.

16. The method of claim 11 wherein the component comprises a keyboard having plural keys and a liquid detection sensor and the lifecycle information comprises a total number of key presses at the keyboard.

17. The method of claim 16 wherein the component comprises a battery having a BMU, the method further comprising storing a liquid detection event of the keyboard at the BMU.

18. The method of claim 16 wherein the component comprises a motherboard having a CPU, the method further comprising storing a liquid detection event of the keyboard on a non-transient memory of the motherboard.

19. The method of claim 11 wherein the component comprises a solid state drive and the lifecycle information includes temperatures sensed at the solid state drive.

20. The method of claim 11 wherein the component comprises a speaker and the lifecycle information comprises vibrations related to sounds played by the speaker.

* * * * *